(12) United States Patent
Bui

(10) Patent No.: US 8,432,879 B2
(45) Date of Patent: Apr. 30, 2013

(54) METHOD OF TRANSMITTING CONTROL CHANNEL INFORMATION IN AN OFDM COMMUNICATION SYSTEM DOWNLINK

(75) Inventor: Thanh Bui, Minato-ku (JP)

(73) Assignee: NEC Corporation, Tokyo (JP)

(*) Notice: Subject to any disclaimer, the term of this patent is extended or adjusted under 35 U.S.C. 154(b) by 874 days.

(21) Appl. No.: 12/525,959

(22) PCT Filed: Feb. 1, 2008

(86) PCT No.: PCT/JP2008/052083
§ 371 (c)(1),
(2), (4) Date: Aug. 5, 2009

(87) PCT Pub. No.: WO2008/096833
PCT Pub. Date: Aug. 14, 2008

(65) Prior Publication Data
US 2010/0316160 A1 Dec. 16, 2010

(30) Foreign Application Priority Data
Feb. 6, 2007 (AU) ............................. 2007900574

(51) Int. Cl.
*H04W 4/00* (2009.01)

(52) U.S. Cl.
USPC ...................................................... 370/338

(58) Field of Classification Search ................ None
See application file for complete search history.

(56) References Cited

U.S. PATENT DOCUMENTS

2008/0049690 A1* 2/2008 Kuchibhotla et al. ......... 370/338
2008/0159323 A1* 7/2008 Rinne et al. .................... 370/431

OTHER PUBLICATIONS

NEC Group, "Unified approach for transmission of DL control channels", RAN WG1 meeting 48 R1-070880, Feb. 6, 2007, St. Louis, Missouri,
NEC Group, "DL control channel", RAN WG1 meeting 48bis R1-071505, Mar. 30, 2007, Malta.
Samsung, "Rules for mapping VRBs to PRBs", 3GPP RAN WG1Meeting #44, R1-060344, Feb. 17, 2006, Denver, USA.
NTT DoCoMo, Fujitsu, KDDI, NEC, Sharp, "Downlink L1/L2 Control Signaling Channel Structure: Mapping", 3GPP TSG RAN WG Meeting #47bis, R1-070104, Jan. 19, 2007, Sorrento, Italy.
Samsung, "DL control channel structure: overview", 3GPP TSG RAN WG1 Meeting #46bis, R1-062534, Oct. 13, 2006, Seoul, Korea.

* cited by examiner

*Primary Examiner* — Andrew Lai
*Assistant Examiner* — Leon Andrews
(74) *Attorney, Agent, or Firm* — Sughrue Mion, PLLC

(57) ABSTRACT

In a method of transmitting control channel symbols in an OFDM communication system downlink in each sub-frame, the OFDM communication system including one or more transmit antennae, for each transmit antenna, each of the OFDM symbols of a control channel which are to be transmitted over the air is mapped to each of the corresponding non-punctured logical resource elements of one virtual control resource block $VCRB_{p,k}$. For each transmit antenna, the logical resource elements in each virtual control resource block $VCRB_{p,k}$ are mapped to physical resource elements in each of the first L OFDM symbols so that the physical resource elements are uniformly spaced over the entire transmission bandwidth. For each transmit antenna, the physical resource elements are transmitted to user equipment.

17 Claims, 15 Drawing Sheets

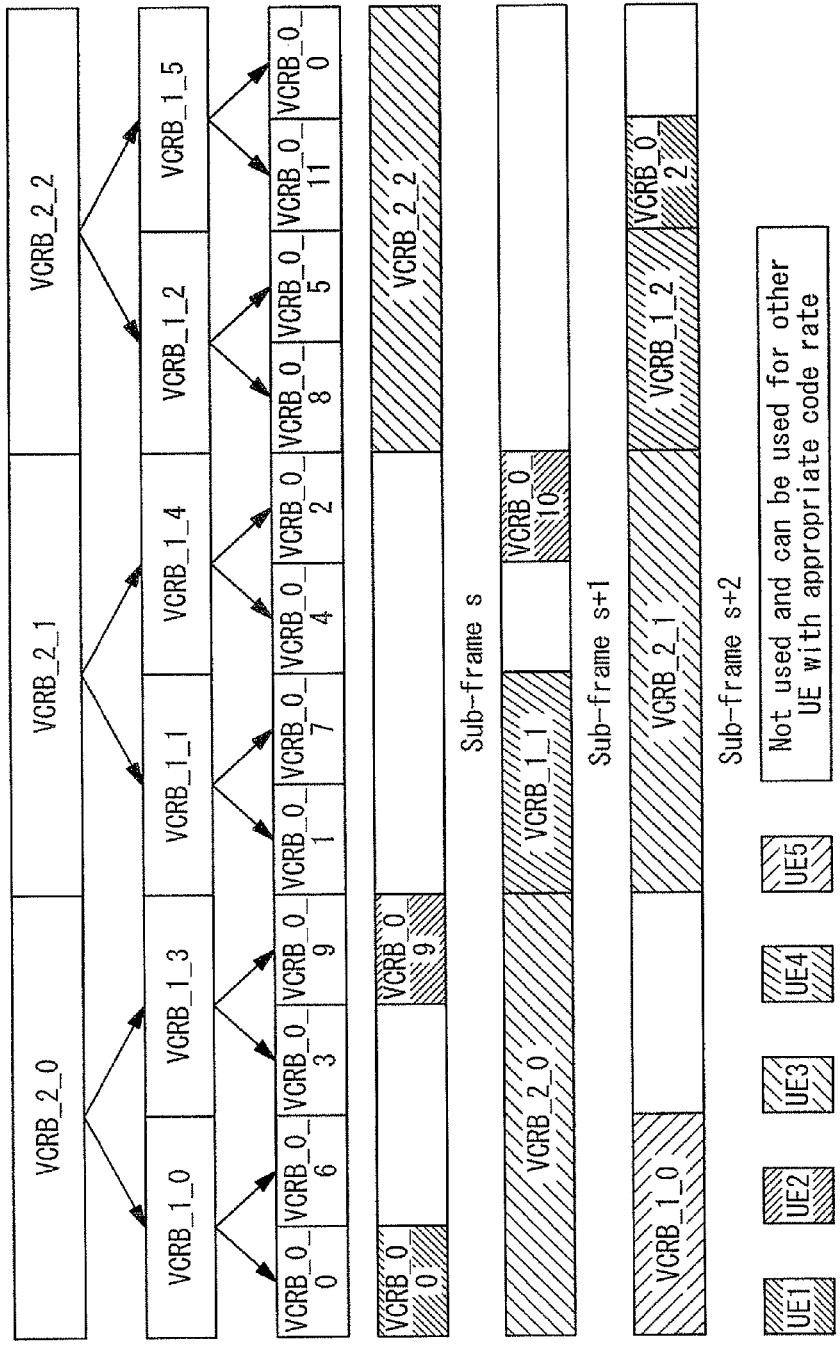

METHOD OF TRANSMITTING CONTROL CHANNEL INFORMATION IN AN OFDM COMMUNICATION SYSTEM DOWNLINK

TECHNICAL FIELD

The present invention relates generally to communication systems operating in accordance with orthogonal frequency division multiplexing (OFDM), and in particular to the transmission of control channel information in the downlink in such communication systems.

BACKGROUND ART

The third Generation Partnership Project (3GPP) is considering a number of possible control channel (CC) types in the OFDM downlink (DL) of the LTE system. These include DL and UL scheduling, Random Access response, Paging scheduling, Acknowledgement for UL packet, Overload indicator and Category size. At each sub-frame, the system can transmit control information to one or multiple User Equipment (UE). For each UE, one or several CC types can be transmitted.

3GPP also has agreed to a number of main requirements for the transmission of control channels in OFDM communication systems. These include individually encoding and transmitting each control channel type in the first L OFDM symbols of a sub-frame ($1 \leq L \leq 3$ and L may change between sub-frame depending on requirement on number of scheduled UE per sub-frame and/or coverage), frequency-division multiplexing of transmissions between control channels, distributing transmission of each control channel over entire system bandwidth, transmitting each control channel information at different code rates depending on the long term signal-to-noise ratio at User Equipment (UE), performing power control for each CC according to short term signal-to-noise ratio at UE, randomizing inter cell interference for each CC, and using higher layer signaling to inform UE about the configuration (transport format and physical mapping) of each control channel to be monitored.

However, a number of important features relating to the transmission of control channels in OFDM communication systems have yet to be defined. For example, it is not clear yet how many types of control channels are to be supported in current and future long-term-evolution (LTE) systems, and how to provide a simple and future-proof system design to effectively handle the transmission of various types of control channels.

There currently exists a need to provide a simple and unifying technique for transmitting different types of control channels in the downlink of LTE systems whilst still meeting existing 3GPP requirements. There also exists a need to provide for the transmission of control channels in the downlink of an OFDM communication system that ameliorates or overcomes one or more disadvantages, problems or inadequacies of existing OFDM communication systems.

DISCLOSURE OF INVENTION

With this in mind, one aspect of the invention provides a method of transmitting control channel symbols in an OFDM communication system downlink in each sub-frame, the OFDM communication system including one or more transmit antennae, the method including:

(a) for each transmit antenna, mapping each of the OFDM symbols of a control channel which are to be transmitted over the air to each of the corresponding non-punctured logical resource elements of one virtual control resource block $VCRB_{p,k}$;

(b) for each transmit antenna, mapping the logical resource elements in each virtual control resource block $VCRB_{p,k}$ to physical resource elements in each of the first L OFDM symbols so that the physical resource elements are uniformly spaced over the entire transmission bandwidth; and (c) for each transmit antenna, transmitting the physical resource elements to user equipment.

The number of $VCRB_{p,k}$ may be given by $$K_{L,p} = \left\lceil \frac{R \cdot N}{B_{L,p}} \right\rceil$$

wherein L is the number of OFDM symbols used for control channel transmission, $1 \leq L \leq 3$, N is the number of physical resource blocks supported by bandwidth of the OFDM communication system, R is the number of sub-carriers in each physical resource block, p is the size index, and $B_{L,p}$ is the number of logical resource elements in a virtual control resource block with size index p to be mapped in each of the L OFDM symbols.

The size of each $VCRB_{p,k}$ denotes as $S_p = L \times B_{L,p}$ may be independent from L, i.e., $$S_p = 1 \times B_{1,p} = 2 \times B_{2,p} = \ldots = L \times B_{L,p}$$

Each set of $B_{L,p}$ LRE of a VCRB may be mapped to $B_{L,p}$ PRE on each of the L OFDM symbols so that within each OFDM symbol, the uniform spacing between physical resource elements is $M \times K_{L,p}$ where $M = 1, 2, 3, \ldots$.

Preferably, $S_{p+1} = D \times S_p$ and D is either 2 or 3

The value of $(R \cdot N / B_{L,p})$ may be an integer.

Each virtual control resource block may carry one control channel.

One or more virtual control resource blocks may be used for multiplexing and transmission of multiple control channels of a same type.

Different virtual control resource block size (different size index p or different VCRB size $S_p$) may be used for transmission of the same control channel type to realize different code rate.

The OFDM communication system may include more than one transmit antenna, and a same virtual control resource block may be used for transmission of the same control channel over each transmit antenna.

At least a first and a second OFDM symbols may be used for control channel transmission, and the mapping in step (b) may be carried out so that the $B_{L,p}$ physical resource elements on each OFDM symbol are offset in frequency compared to $B_{L,p}$ physical resource elements on the other OFDM symbol.

The logical resource elements mapped in step (b) on physical resource elements are reserved for a reference signal or other special channel may not be used for control channel transmission.

The unused logical resource elements may be labeled as punctured.

All virtual control resource blocks may have substantially the same amount of punctured logical resource elements.

The virtual control resource blocks used in step (a) may be organized in a tree structure to enable efficient sharing of $VCRB_{p,k}$ between transmission of multiple control channels to different UE within the same sub-frame.

The tree structure may have P levels with the top being level P−1 and the bottom being level 0, wherein at the top level P−1, there are $K_{L,P-1}$ VCRBs, wherein at any level $0 \leq p \leq P-1$, there are $2^{(P-p-1)} K_{L,P-1}$ VCRBs, and wherein at any level $1 \leq p < P-1$, each $VCRB_{p,k}$ contains 2 VCRB, $VCRB_{p-1,k}$, $VCRB_{p-1,k+(p-p-1)KL,P}$ at the lower level p−1.

The tree structure may further have special numbering for each VCRB which simplifies the mapping in step b), enables simple frequency hopping and inference randomization, and enables simple and reliable control channel detection process at the UE.

If a CC is sent to a UE using VCRB k of size index p in sub-frames s, then in the sub-frame s+1, VCRB (k+1)mod $K_{L,p}$ of size index p may be used to transmit the same CC type to the same UE if such transmission takes place.

BRIEF DESCRIPTION OF DRAWINGS

The invention will now be described in further detail by reference to the accompanying drawings. It is to be understood that the particularity of the drawings does not supersede the generality of the preceding description of the invention.

FIG. 15 is a chart showing the principle for scheduling of VCRBs for transmission of multiple CC to multiple UE in each sub-frame, to achieve "frequency hopping" and "interference randomizing" effect.

BEST MODE FOR CARRYING OUT THE INVENTION

The acronyms shown in Table 1 below will be referred to in the description of the drawings.

TABLE 1

| | |
|---|---|
| RE | Resource element |
| LRE | Logical RE |
| PRE | Physical RE |
| RS | Reference signal |
| PRB | Physical Resource Block |
| DL | Downlink |
| FH | Frequency Hopping |
| VCRB | Virtual Control Resource Block |
| FDM | Frequency Division Multiplexing |
| TDM | Time Division Multiplexing |
| CC | Control Channel |
| CDD | Cyclic Delay Transmit Diversity |
| SFBC | Space Frequency Block Coding |

Figure 1:
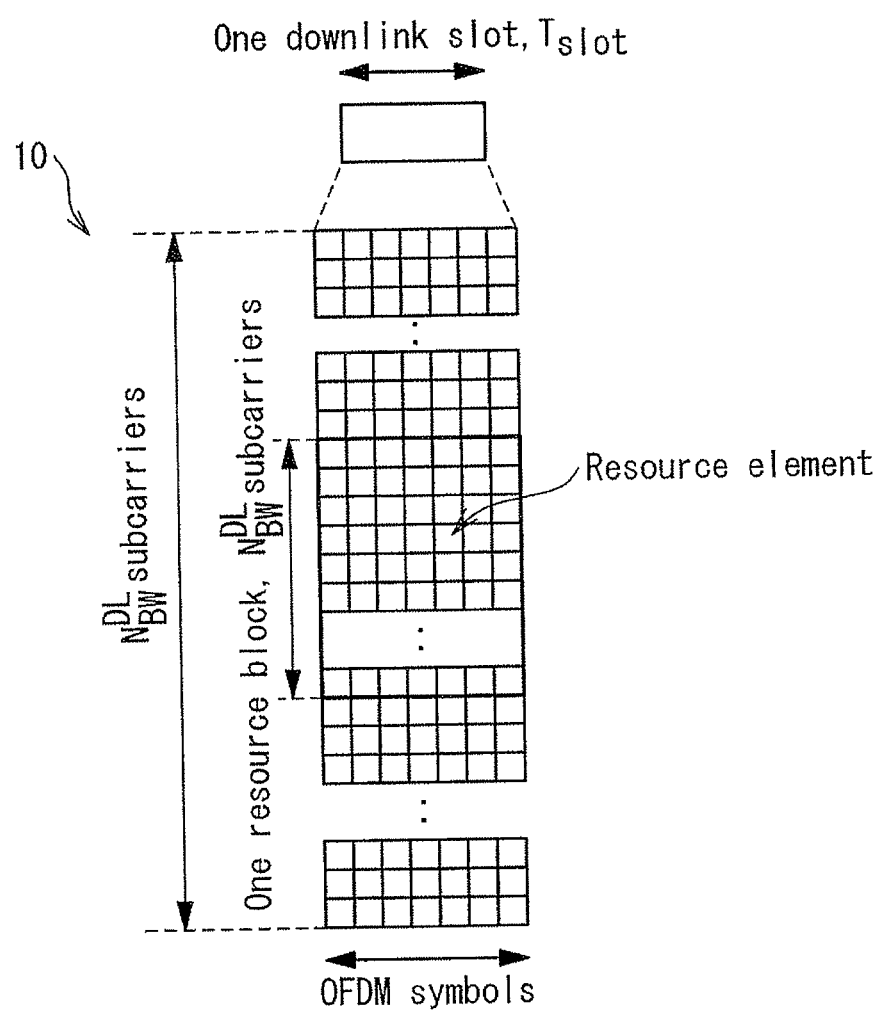
FIG. 1 is a schematic diagram of a resource grid describing transmitted signals in each slot of an OFDM communication system.

An OFDM downlink signal corresponds to a set of resource elements used by the physical layer in an OFDM communication system. The transmitted signal in each slot is described by a resource grid or resource block of $N^{DL}_{BW}$ sub-carriers and $N^{DL}_{symb}$ OFDM symbols. An illustrative resource grid 10 is shown in FIG. 1. In case of multi-antenna transmission, there is one resource grid defined per antenna port. There are 20 slots (i=0, 1, . . . , 19) in each 10 ms radio frame. A sub-frame is defined as two consecutive slots where subframe i consists of slots 2i and 2i+1.

Figure 2:
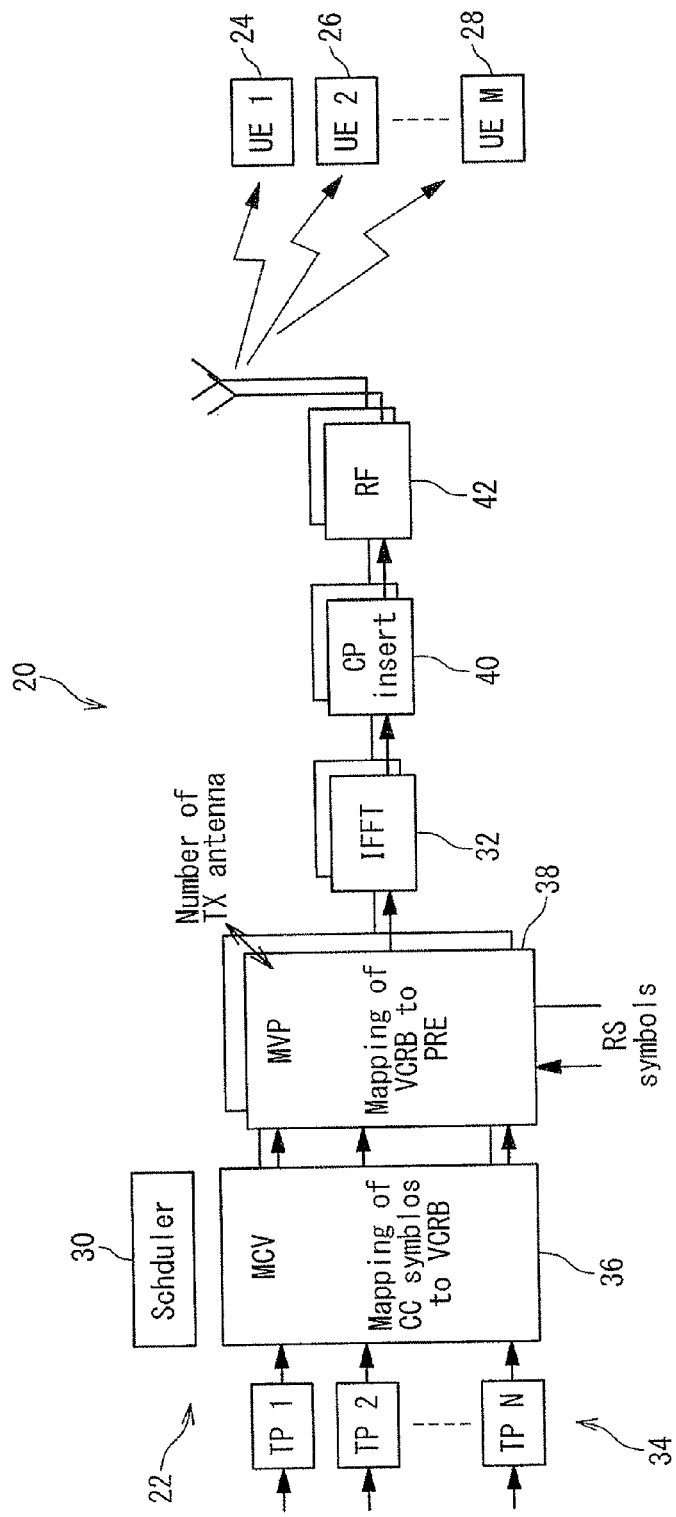
FIG. 2 is a schematic diagram showing a base station and a UE forming part of an OFDM communication system.

FIG. 2 shows generally an OFDM communication system 20 including a base station 22 transmitting to multiple UE 24, 26 and 28. A scheduler 30 has control over all functional blocks in the base station 22 prior to an IFFT block 32. At each sub-frame, the scheduler 30 schedules a number of DL CCs for a number of UE. One UE may receive more than one CC types in a sub-frame. There can be much larger number of UE than the number of CCs that can be scheduled in one sub-frame (M>>N). To share the limited radio resource among M UE, a CC among N CCs may carry information for different UE at a different sub-frame (TDM).

Transport processing blocks 34 act to receive a control information block, which is then convolutionally encoded, rate-matched, interleaved and modulated. The output of the transport processing blocks 34 is complex symbols of the CCs to be transmitted over the air interface to UE. The base station 22 may include 1, 2 or 4 transmit (Tx) antennae.

The MCV block 36 acts to map the output of the transport processing blocks 34 to a VCRB for each Tx antenna, whilst the MVP block 38 acts to map the VCRB to a PRE for each Tx antenna. The output of the MVP block 38, for each Tx antenna, is then passed through the IFFT block 32, a CP inserted in the CP Insertion block 40 and then the control channel information is transmitted over the air interface by an RF block 42.

In general terms, the MCV block 36 defines each $VCRB_{p,k}$ as a Virtual Control Resource Block k of size index p, where k=0, 1, . . . $K_{L,P}-1$, $K_{L,P}$ being the number of VCRBs when L OFDM symbols are used for CC transmission ($1 \leq L \leq 3$) and p being the size index of the virtual control resource block (p=0, 1, . . . , P−1). Each $VCRB_{p,k}$ is a two dimension block of size $S_p = L \times B_{L,p}$, measured in number of LREs, where $B_{L,P}$ is the number of LREs to be mapped in each of the L OFDM symbols.

The number of LREs $S_p$ is preferably independent from the number L of OFDM symbols are used for CC transmission, i.e., it is desirable that $Sp = 1 \times B_{1,p} = 2 \times B_{2,p} = 3 \times B_{3,p} \Rightarrow Sp \in \{6n: n=1, 2, \ldots\}$ It is desirable that values of $S_0$ and $S_{P-1}$ are such that the corresponding $VCRB_{p,k}$ can respectively carry the smallest and largest information blocks at the highest and lowest code rate, and that $S_{p+1} = 2S_p$, i.e. sending an information block on VCRBs of different sizes realizes different code rates.

Preferably, the number $K_{L,P}$ of VCRBs when L OFDM symbols are used for CC transmission is given by $$K_{L,p} = \left\lceil \frac{12N}{B_{L,p}} \right\rceil$$

where N is number of PRB in the system bandwidth. In this exemplary embodiment, each PRB has 12 sub-carriers. It is generally desirable that ($12N/B_{L,P}$) is an integer so that all active sub-carriers are fully utilized. It will be appreciated that in other embodiments of the invention, another number of sub-carriers may be used in each PRB.

Each $VCRB_{p,k}$ can be used to carry one CC. A different value is used to support a different code rate. If more than one Tx antennae are used in the base station 22, the same $VCRB_{p,k}$ can be used for transmission of the same CC over each Tx antenna.

For each Tx antenna, a LRE of each $VCRB_{p,k}$ can be mapped to a PRE as follows:

$B_{L,P}$ LREs are mapped to $B_{L,P}$ PREs on each of the L OFDM symbols;

The mapping is carried out so that $B_{L,P}$ PREs on each of the L OFDM symbols are as uniformly distributed over the entire bandwidth as possible to maximize frequency diversity. In particular, the uniform spacing between the PREs preferably is $K_{L,P}$;

When $L \geq 2$, the mapping is carried out so that $B_{L,P}$; PREs on each OFDM symbol are offset in frequency compared to $B_{L,P}$ PREs on any other OFDM symbols to maximize frequency diversity;

The LREs mapped on PREs reserved for transmission of RS (or some other special channel) are not available for transmission of the CCs. These LREs are called "punctured LREs". It is desirable that all $VCRB_{p,k}$ have similar amounts of punctured LREs.

To reduce blind detection i.e. UE processing complexity and improve reliability of CC reception, each UE is configured to receive one or more CC types. For each CC type, it is desirable that a UE is configured to monitor multiple VCRBs of only one size index p. If a UE detects a CC on a $VCRB_{p,k[s]}$ at sub-frame s, the UE knows which $VCRB_{p,k[s+n]}$ is to receive in sub-frame s+1 to get the same CC type at sub-frame s+1, i.e. the UE does not have to perform detection of CC on multiple VCRBs every sub-frame.

To randomize inter-cell interference and improve frequency diversity, transmission of the same CC type to the same UE should be on different VCRB in different sub-frame, i.e. $k[s+1] \neq k[s]$. There must be pre-defined rule so that if UE detects $VCRB_{p,k[s]}$ at sub-frame s, then UE knows $VCRB_{p,k[s]}$. Also, collision between the hopping CCs of different UE must be avoided.

It is desirable that as many types of CC are transmitted using $VCRB_{p,k}$ as possible. For some very small CCs, multiple CCs can be multiplexed on the same $VCRB_{p,k}$.

Figure 3:
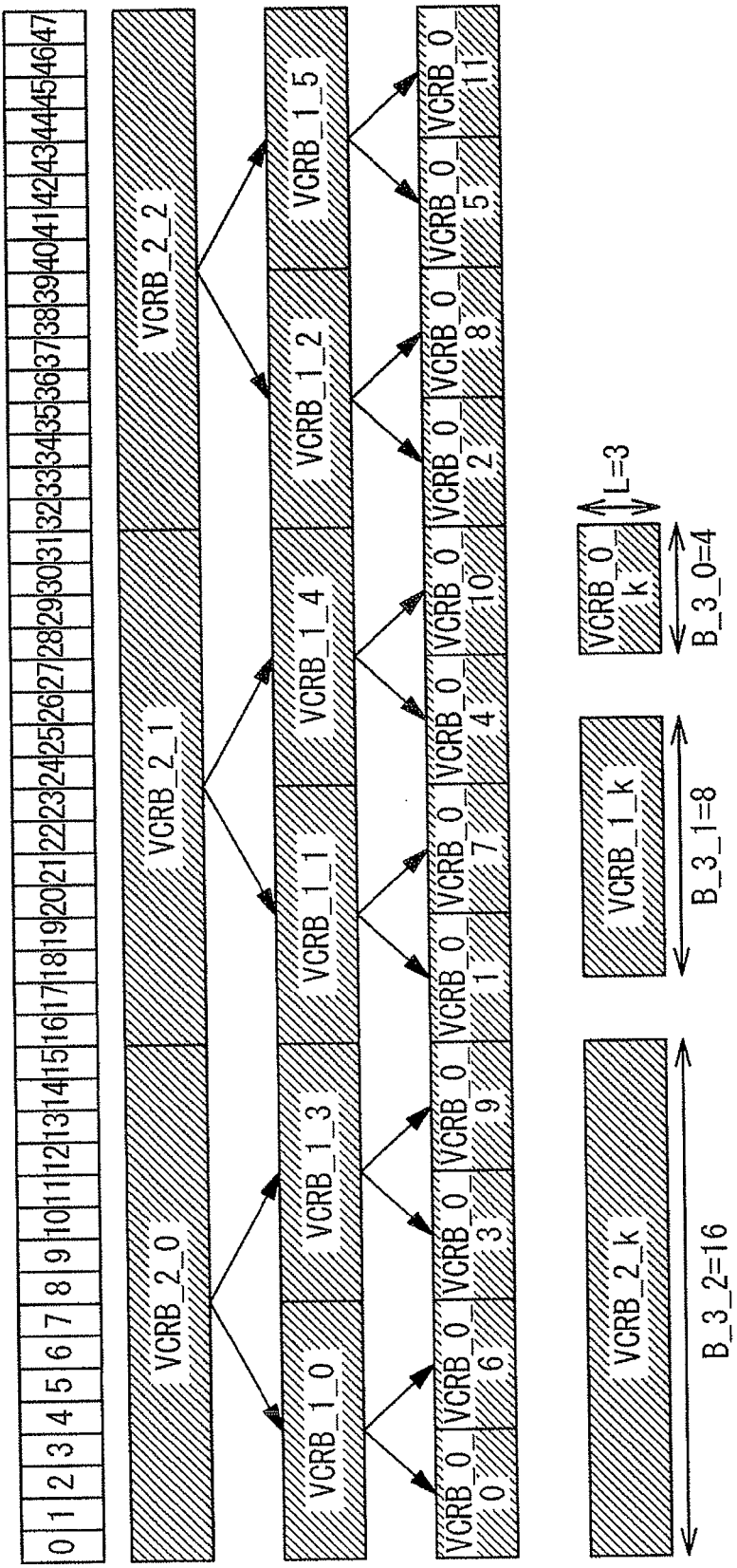
FIGS. 3 and 4 are charts illustrating the tree structure of VCRBs with different size index.
Figure 4:
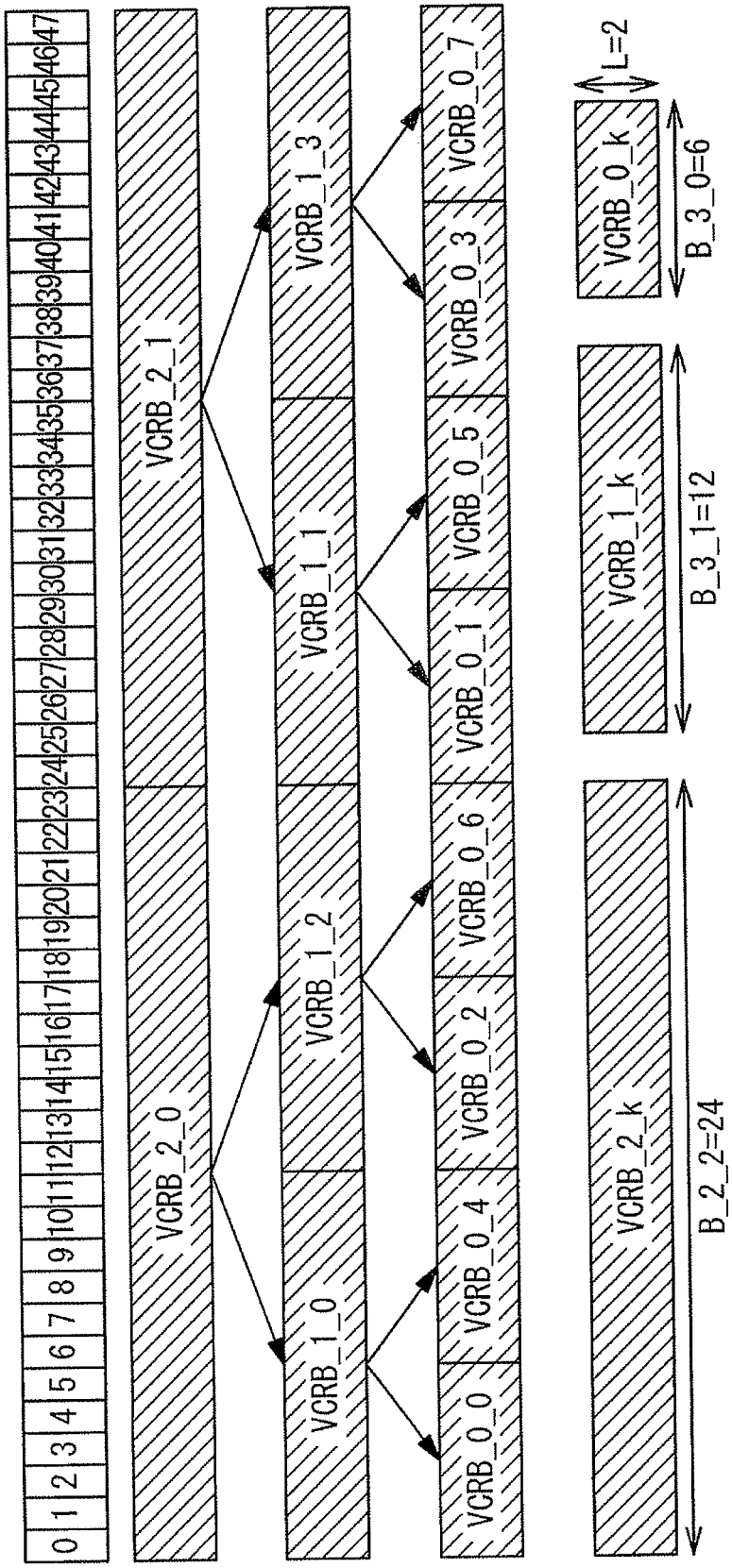

FIGS. 3 and 4 shows exemplary code trees in which there are 48 active sub-carriers (referenced 0 to 47) used, i.e. the number N of PRB in the system bandwidth is 4. In FIG. 3, P=3 and L=3, whereas in FIG. 4, P=3 and L=2. The various sizes of the VCRBs at size indexs 0, 1 and 2 are respectively $S_0=12$, $S_1=24$, $S_2=48$.

The numbering of VCRBs in the tree structure show in FIGS. 3 and 4 is carried out so as to facilitate mapping of the VCRBs on PREs, as will be described below. From these figures, it can be appreciated that the tree has P levels with the top being level P−1 and the bottom being level 0. At the top level P−1, there are $K_{L,P-1}$ VCRBs. At any level $0 \leq p < P-1$, there are $2^{(P-p-1)}K_{L,P}$ VCRBs. At any level $1 \leq p \leq P-1$, each $VCRB_{p,k}$ contains 2 VCRBs: $VCRB_{p-1,k}$ and $VCRB_{p-1,k+(P-p-1)KL,p}$ at the lower level p−1.

This general mapping technique is applicable for mapping of LREs on each of the L OFDM symbols. In case of a base station having a single Tx antenna, or in case where 2 Tx antennae are used together with CDD, the set of $B_{L,p}$ LREs of a VCRB k of size index p to be mapped in a OFDM symbol l is given by $x_{p,k,l}(0), x_{p,k,l}(1), \ldots, x_{p,k,l}(B_{L,p}-1)$, where $0 \leq l \leq L-1$. The set of PRE in any OFDM symbol l is given by $y(0), y(1), \ldots, y(12N-1)$.

The mapping between LRE and PRE is given by:

$$y(\lfloor Q_l + k + nK_{L,p} \rfloor \bmod [12N]) = x_{p,k,l}(n) \quad n=0, 1, \ldots, B_{L,p}-1; k=0, 1, \ldots, K_{L,p}-1$$

where $Q_l$ is a frequency offset applied to OFDM symbol l.

The numbering of the VCRB and the mapping has mean characteristics that the first element $x_{p,k,l}(0)$ of VCRB k is mapped on $Q_l+k$ PRE, there is uniform spacing between PRE is $K_{L,p}$, and different $Q_l$ values are used for different values of l to create frequency diversity.

Figure 5:
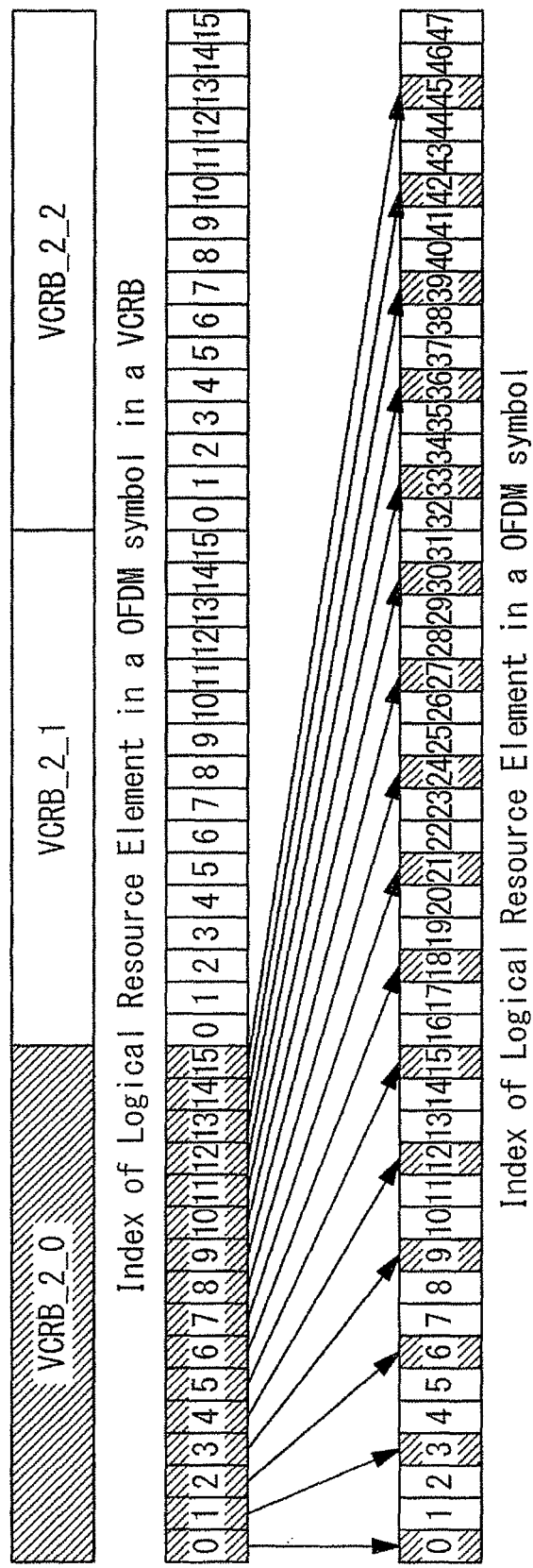
FIGS. 5 to 14 are charts illustrating different mappings of logical resource elements in each virtual control resource block to physical resource elements in each of the L OFDM symbols used for CC transmission.
Figure 6:
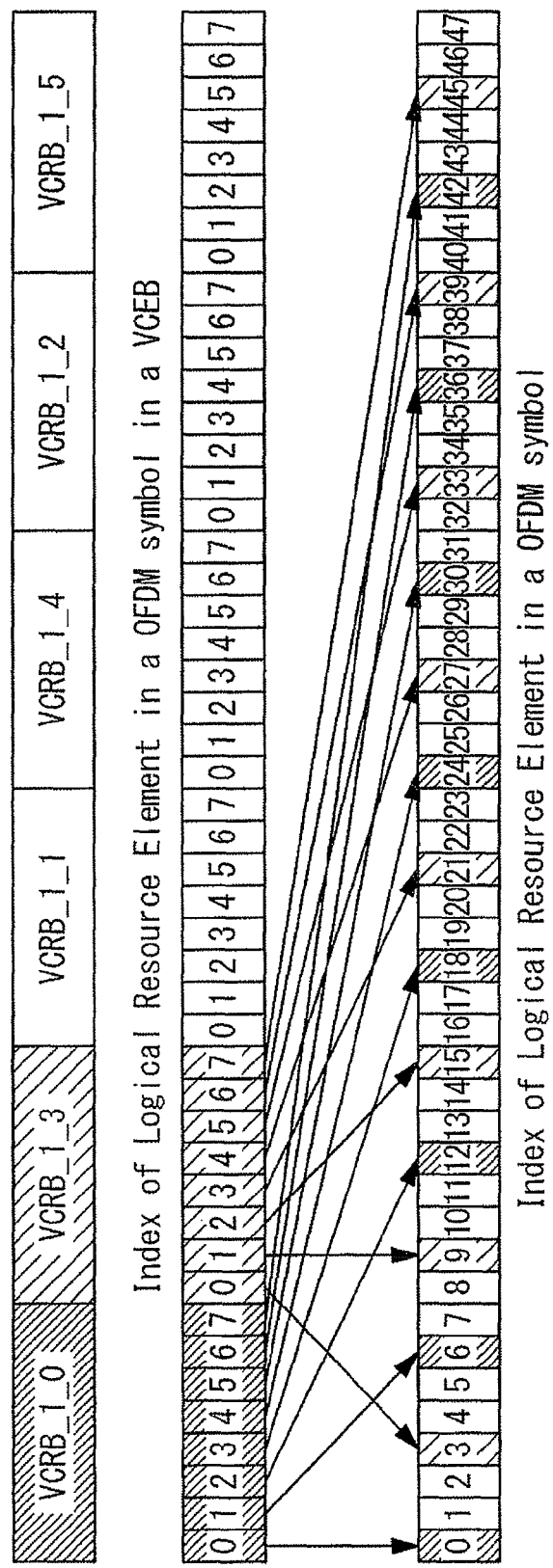
Figure 7:
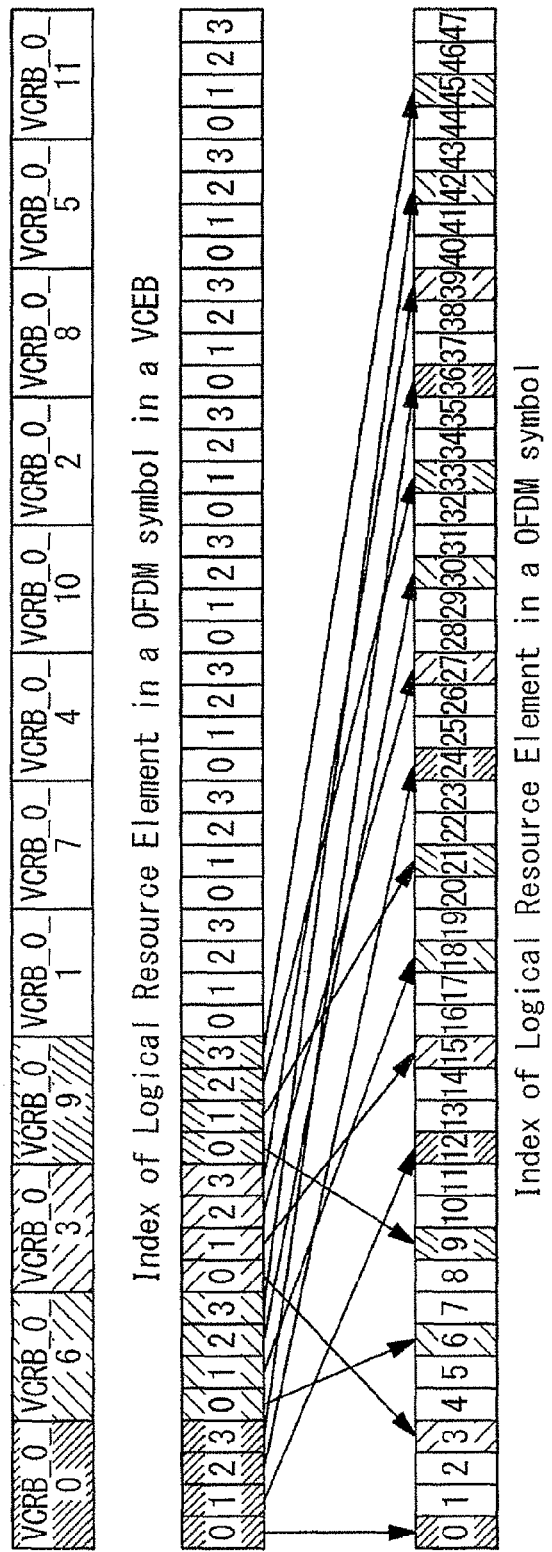
Figure 8:
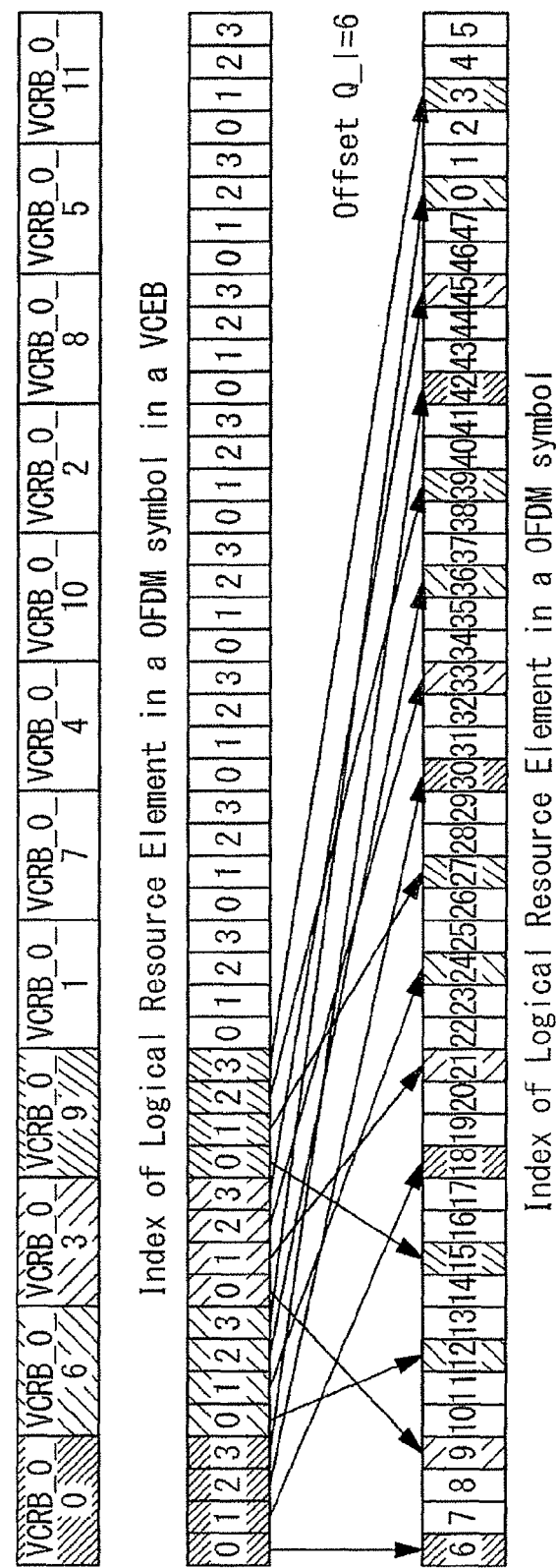

FIGS. 5, 6 and 7 illustrate this general mapping technique for each of the three VCRB size index levels shown in FIG. 3. In these Figures, $Q_l=0$, P=3 and L=3. FIG. 8 shows a variation in which a frequency offset of 6 sub-carriers is applied to the mapping scheme shown in FIG. 7, in which $Q_l=6$ p=0 and L=3.

Figure 9:
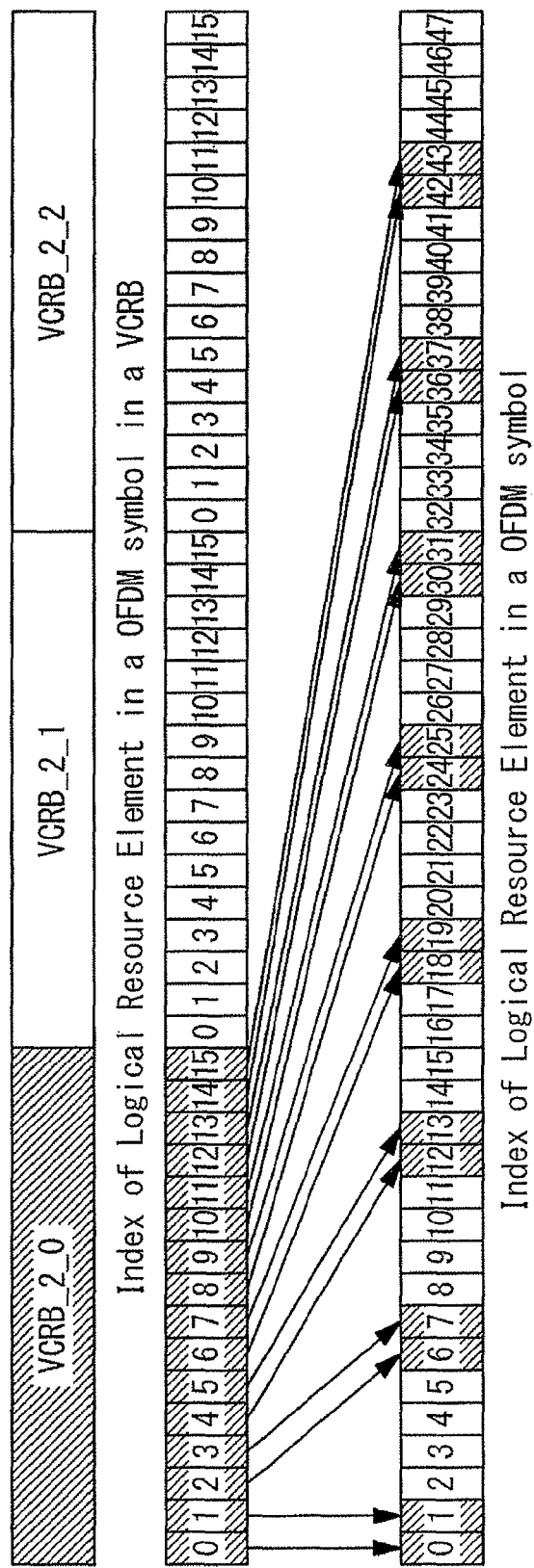
Figure 10:
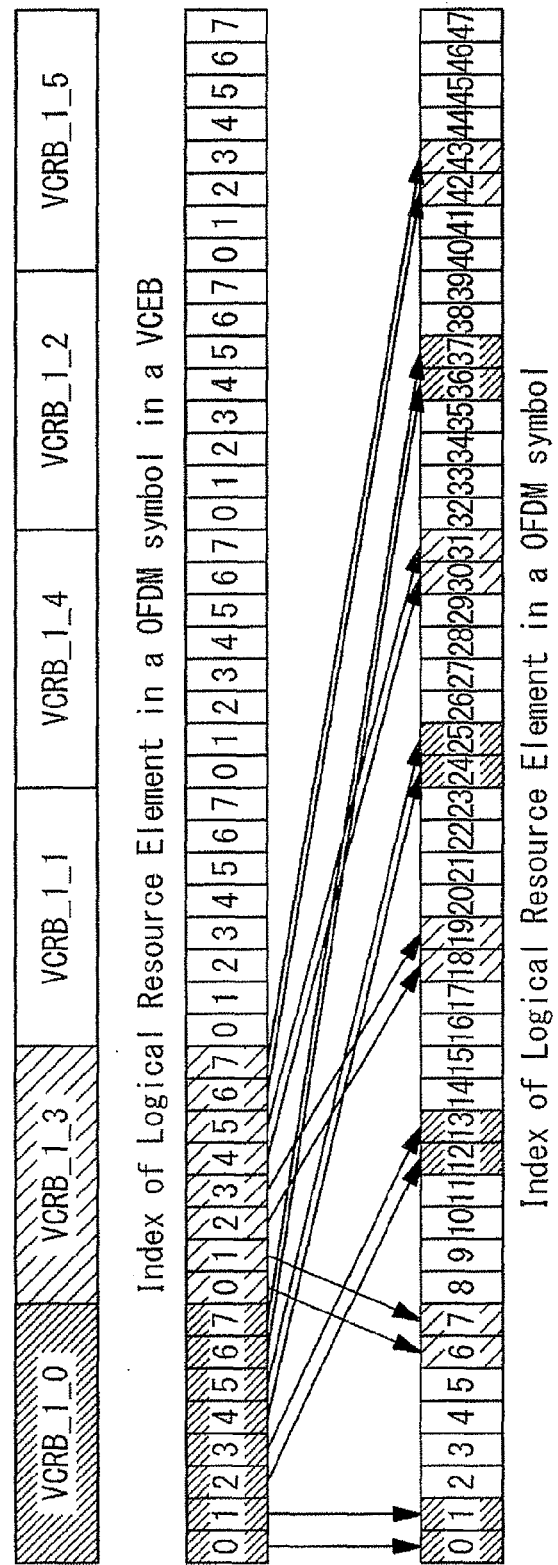
Figure 11:
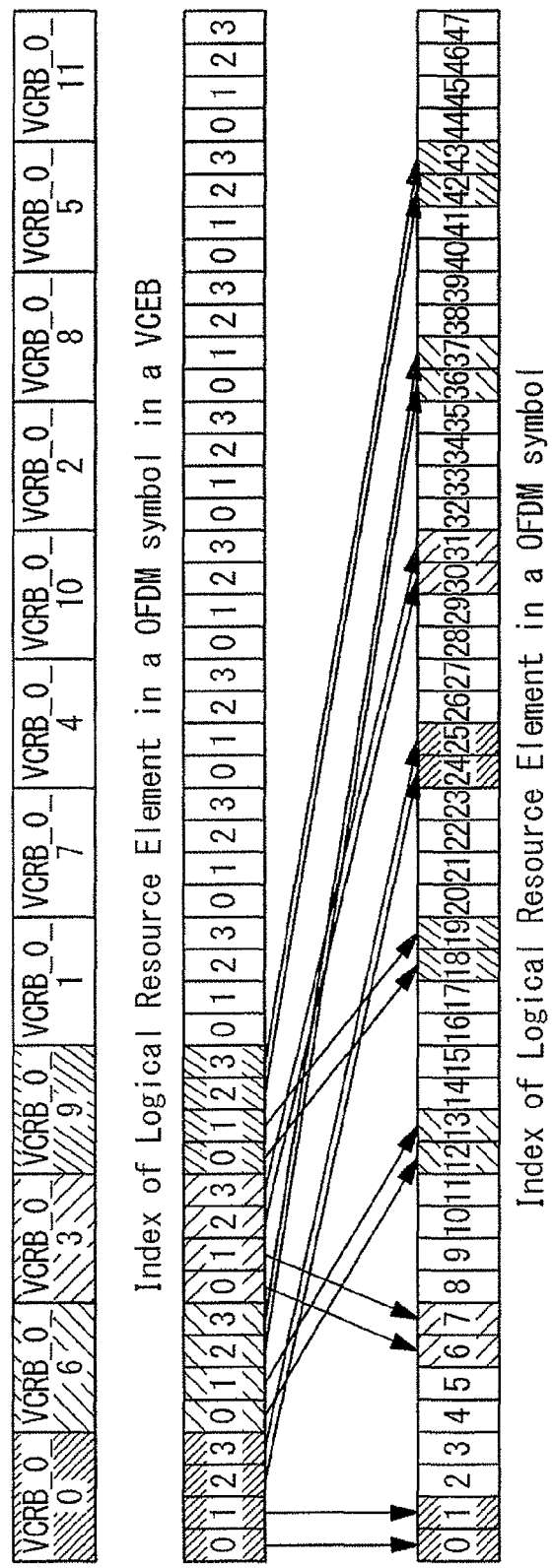

FIGS. 9, 10 and 11 illustrates further exemplary mapping schemes for each of the three VCRB index layers shown in FIG. 3, in case of a base station 20 in which 2 antennae are used together with SFBC. In this case, the $B_{L,p}$ LREs of a VCRB k of size index p mapped in a OFDM symbol l are organized in pairs according to:

$$\{x_{p,k,l}(2n), x_{p,k,l}(2n+1)\} \quad n = 0, 1, \ldots, \frac{B_{L,p}}{2} - 1$$

where $B_{L,p}$ must be an even number. The mapping between LRE and PRE is given by:

$$y(\lfloor Q_l + 2k + 2nK_{L,p} + m \rfloor \bmod[12N]) = x_{p,k,l}(2n+m)$$

$$n = 0, 1, \ldots, \frac{B_{L,p}}{2} - 1;$$

$$m = 0, 1;$$

$$k = 0, 1, \ldots, K_{L,p} - 1$$

where $Q_l$ is a frequency offset applied to OFDM symbol l.

The numbering of each VCRB and the mapping has mean characteristics of the first element $x_{p,k,l}(0)$ of VCRB k being mapped on $Q_l+2k$ PRE, uniform spacing between each PRE pair being $2K_{L,p}$, and using different $Q_l$ (even number) for different value of l create more frequency diversity. In these Figures, $Q_l=0$ P=3, L=3.

Special instances of mapping can arise, for example in case of a base station 20 in which 1 Tx antenna or 2 Tx antennae are used together with CDD. When general mapping is applied for mapping of an LRE on a OFDM symbol containing RS (the current assumption in LTE is that the first OFDM symbol in a sub-frame carries RS for all Tx antennae), due to RS spacing per Tx antenna being 6 (when 2 Tx antennae are put together, the spacing becomes 3) and $K_{L,p}$ is likely to be multiple of 6.

Figure 12:
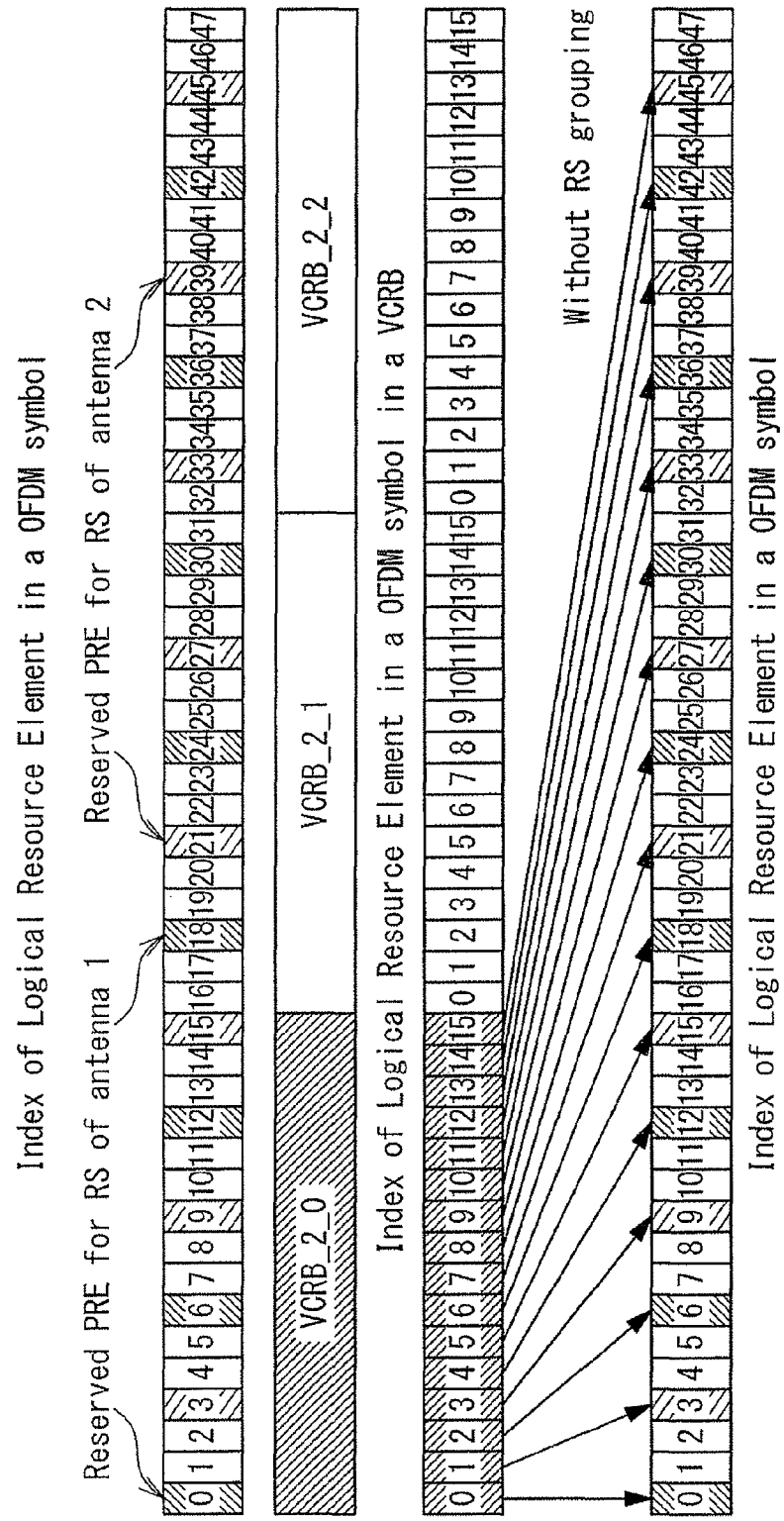

It may happen that for some VCRBs, all LREs to be mapped on the first OFDM symbol will be punctured while for other VCRB none of LRE is punctured. This is illustrated in FIG. 12, where all $B_{3,2}=16$ LREs of $VCRB_{2,0}$ that are mapped on the first OFDM symbol are punctured, while all $B_{3,2}=16$ LREs of $VCRB_{2,1}$ and $VCRB_{2,2}$ are transmitted.

Figure 13:
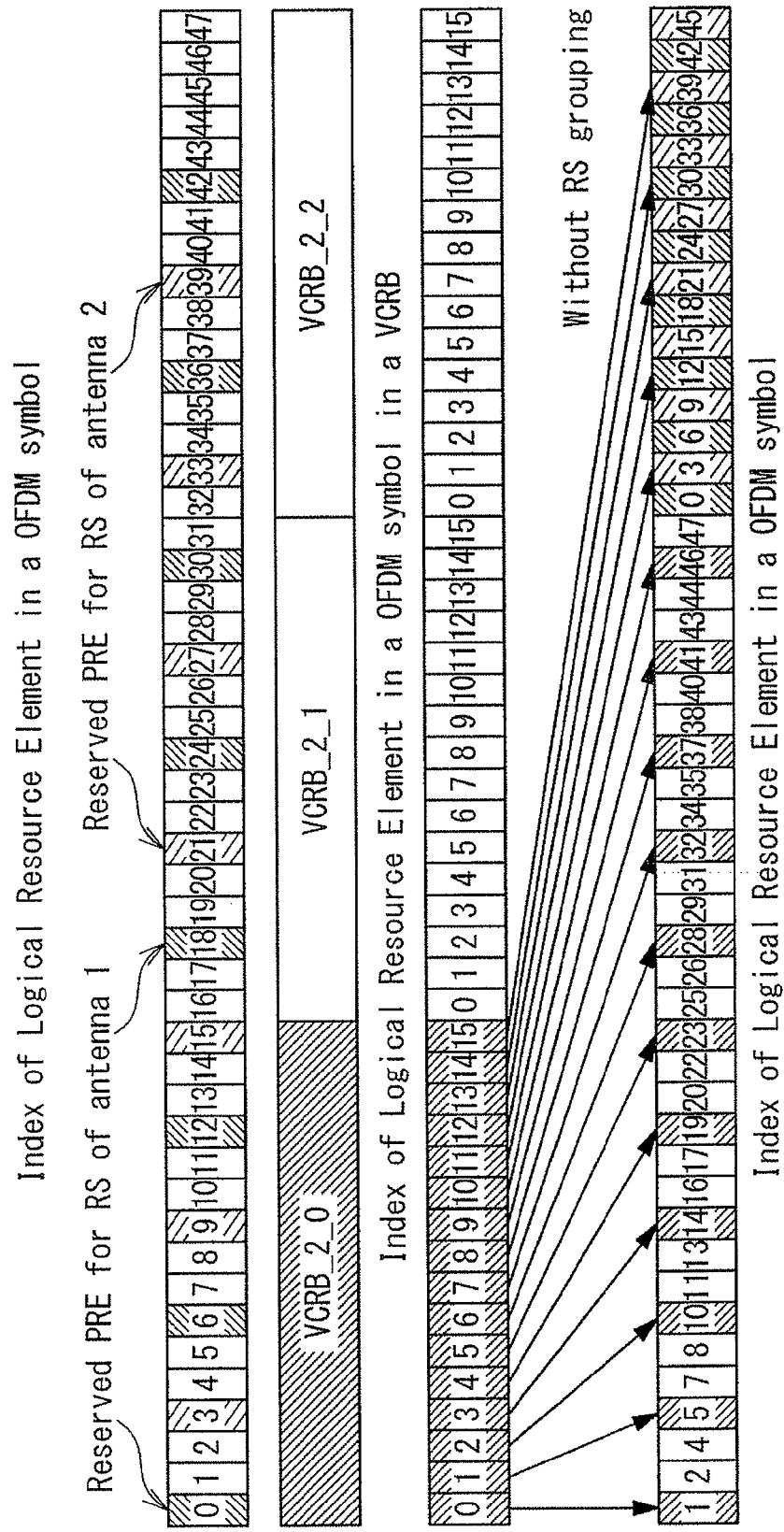

If it is desirable that all VCRBs k of same size index p have a similar number of punctured LREs, mapping "with RS grouping" can be used, as shown in FIG. 13. The basic steps for this mapping are follows:

Form a vector z of size 12N (when 12 sub-carriers are used per PRB) where the first elements correspond to PREs available for CC transmission among $y(0), y(1), \ldots, y(12N-1)$. The remaining elements correspond to PREs reserved for RS.

Perform general mapping between z and x where $$z(\lfloor Q_l+k+nK_{L,p} \rfloor \bmod[12N])=x_{p,k,l}(n) \quad n=0, 1, \ldots, B_{L,p}-1; k=0, 1, \ldots, K_{L,p}-1.$$

Forming of the first elements corresponding to a PRE available for CC transmission of z from y can be written in formula in the cases of 1Tx antenna and 2Tx antennae as follows:

| Number of Tx antennae | PRE reserved for RS | PRE for CC transmission |
|---|---|---|
| 1 | y(6n + R) Where n = 0, 1, ..., 2N − 1 and 0 ≦ R ≦ 5 is some offset (due to RS shift/hopping) | z(5n + m) = y((6n + R + m + 1) mod(12N)) Where n = 0, 1, ..., 2N − 1; m = 0, 1, ..., 4 |
| 2 | y(3n + R) Where n = 0, 1, ..., 4N − 1 and 0 ≦ R ≦ 2 is some offset (due to RS shift/hopping) | z(2n + m) = y((3n + R + m + 1) mod(12N)) Where n = 0, 1, ..., 4N − 1; m = 0, 1 |

Figure 14:
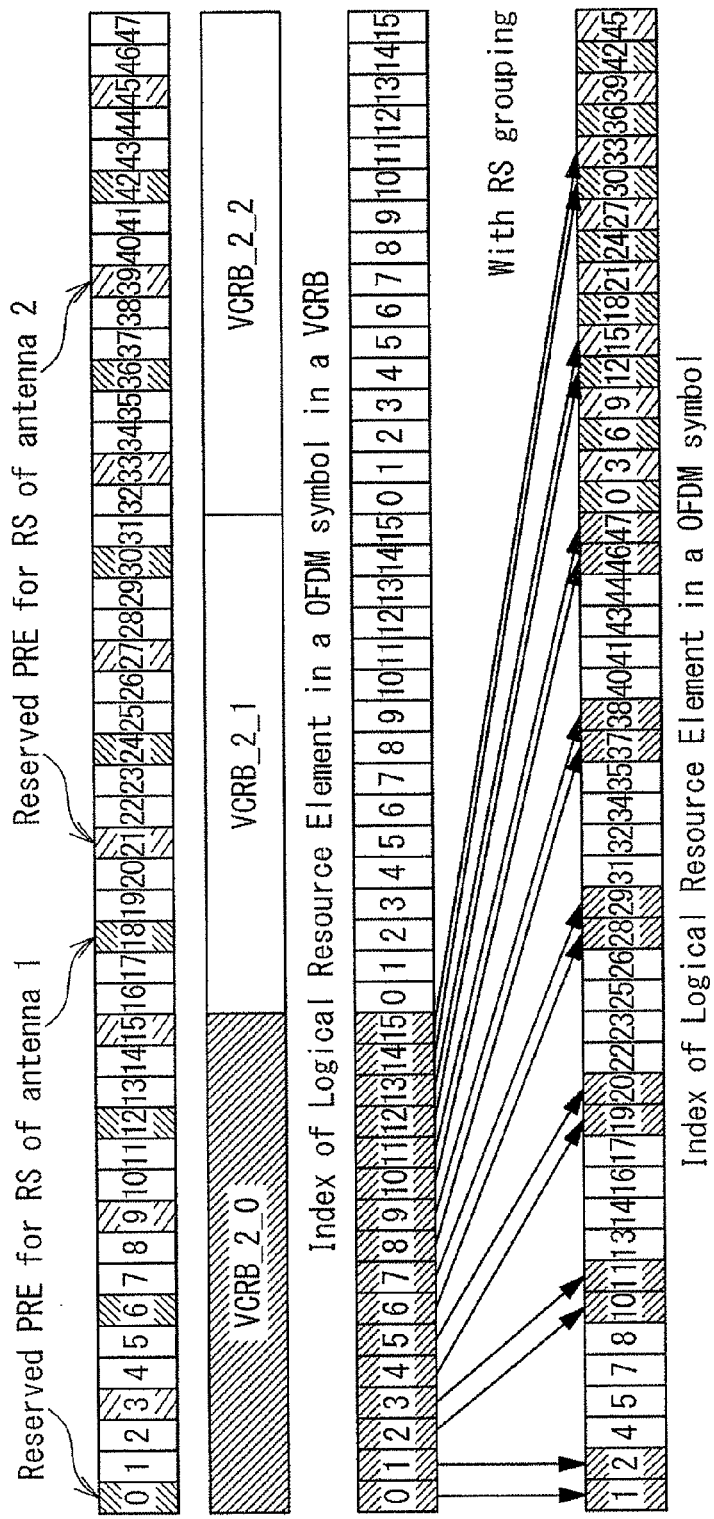

An analogous situation where the base station 20 includes 2 Tx antennae and SFBC is used, is shown in FIG. 14.

The mapping when 4Tx antennae are used can be developed in the same way or combination of ways that used for mapping when 2Tx antennae are used.

FIG. 15 illustrates principle for scheduling of VCRB for transmission of multiple CC to multiple UE in each sub-frame, to achieve "frequency hopping" and "interference randomizing" effect. In this case, L does not change between sub-frames. In this figure, there is one type of CC for each UE (if sent) in each sub-frame. The size of VCRB for each UE is fixed. A CC for UE3/UE2/UE4 is sent over 3/2/2 consecutive sub-frames. The transmission follows a simple rule that If a CC is sent to a UE in a sub-frame s using VCRB k of size index p Then in the sub-frame s+1, the same type CC is sent to the same UE using VCRB (k+1)mod $K_{L,p}$ of the same size index p.

This rule simplifies UE implementation as follows. When a UE, after decoding multiple CC in a sub-frame s, detects a CC on a VCRB k of size index p, the UE can receive the same type CC on VCRB (k+1)mod $K_{L,p}$ of the same size index p in the sub-frame s+1, i.e. the UE does not have to try multiple decoding every sub-frame.

Moreover, the mapping scheme shown in FIG. 15 provides a simple mechanism for randomizing inter cell interference and for improving frequency diversity gain. Note that even though L is constant over multiple sub-frames in example in FIG. 15, the same rule can be used when L is changing between sub-frames.

The above-described embodiments of the invention provides a simple and unifying approach/method for transmitting different types of control channel (CC) with different coding rate (or coverage requirement) in the DL of LTE system. Advantageously, these embodiments maximize frequency diversity gain for each control channel within a sub-frame, maximizes frequency diversity gain for each control channel between sub-frames and effectively randomizes inter cell interference, and uniformly distributes the puncturing rate for all control channels within a sub-frame.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The invention claimed is:

1. A method of transmitting control channel symbols in an OFDM communication system downlink in each sub-frame, the OFDM communication system including one or more transmit antennae, the method including:
   (a) for each transmit antenna, mapping each of OFDM symbols of a control channel which are to be transmitted over the air to each of corresponding non-punctured logical resource elements of one virtual control resource block $VCRB_{p,k}$;
   (b) for each transmit antenna, mapping logical resource elements in each virtual control resource block $VCRB_{p,k}$ to physical resource elements in each of the first L OFDM symbols so that the physical resource elements are uniformly spaced over the entire transmission bandwidth; and
   (c) for each transmit antenna, transmitting the physical resource elements to user equipment,
   wherein the number of $VCRB_{p,k}$ is given by $$K_{L,p} = \left\lceil \frac{R \cdot N}{B_{L,p}} \right\rceil$$

and
wherein L is the number of OFDM symbols used for control channel transmission, 1≦L≦3,
N is the number of physical resource blocks supported by bandwidth of the OFDM communication system,
R is the number of sub-carriers in each physical resource block,
p is the size index, and
$B_{L,p}$ is the number of logical resource elements in a virtual control resource block with size index p to be mapped in each of the L OFDM symbols.

2. A method according to claim 1, wherein the size of each $VCRB_{p,k}$ denotes as $S_p = L \times B_{L,p}$ is independent from L i.e.

$$S_p = 1 \times B_{1,p} = 2 \times B_{2,p} = \ldots = L \times B_{L,p}.$$

3. A method according to claim 1, wherein each set of $B_{L,p}$ LRE of a VCRB is mapped to $B_{L,p}$ PRE on each of the L OFDM symbols so that within each OFDM symbol, the uniform spacing between the physical resource elements is $M \times K_{L,p}$ where M=1, 2, 3, ....

4. A method according to claim 1, wherein $S_{p+1} = D \times S_p$ and D is either 2 or 3.

5. A method according to claim 1, wherein the value of $(R, N/B_{L,p})$ is an integer.

6. A method according to claim 1, wherein each virtual control resource block carries one control channel.

7. A method according to claim 1, wherein one or more virtual control resource blocks can be used for multiplexing and transmission of multiple control channels of a same type.

8. A method according to claim 1, wherein different virtual control resource block size (different size index p or different VCRB size $S_p$) can be used for transmission of the same control channel type to realize different code rate.

9. A method according to claim 1, wherein the OFDM communication system includes more than one transmit antennae, and wherein a same virtual control resource block is used for transmission of the same control channel over each transmit antenna.

10. A method according to claim 1, wherein at least a first and a second OFDM symbol are used for control channel transmission, and wherein the mapping in step (b) is carried out so that that the $B_{L,p}$ physical resource elements on each OFDM symbol are offset in frequency compared to $B_{L,p}$ physical resource elements on the other OFDM symbol.

11. A method according to claim 1, wherein the logical resource elements mapped in step (b) on physical resource elements reserved for a reference signal or other special channel are not used for control channel transmission.

12. A method according to claim 11, wherein the unused logical resource elements are labeled as punctured.

13. A method according to claim 12, wherein all the virtual control resource blocks have substantially the same amount of punctured logical resource elements.

14. A method according to claim 1, wherein the virtual control resource blocks used in step (a) are organized in a tree structure to enable efficient sharing of $VCRB_{p,k}$ between transmission of multiple control channels to different UE within the same sub-frame.

15. A method of transmitting control channel symbols in an OFDM communication system downlink in each sub-frame, the OFDM communication system including one or more transmit antennae, the method including:
   (a) for each transmit antenna, mapping each of OFDM symbols of a control channel which are to be transmitted over the air to each of corresponding non-punctured logical resource elements of one virtual control resource block $VCRB_{p,k}$;
   (b) for each transmit antenna, mapping logical resource elements in each virtual control resource block $VCRB_{p,k}$ to physical resource elements in each of the first L OFDM symbols so that the physical resource elements are uniformly spaced over the entire transmission bandwidth; and
   (c) for each transmit antenna, transmitting the physical resource elements to user equipment,
   wherein the virtual control resource blocks used in step (a) are organized in a tree structure to enable efficient sharing of $VCRB_{p,k}$ between transmission of multiple control channels to different UE within the same sub-frame, and
   wherein the tree has P levels with the top being level P−1 and the bottom being level 0, wherein at the top level P−1, there are $K_{L,P-1}$ VCRBs, wherein at any level $0<p<P-1$, there are $2^{(P-p-1)}K_{L,P-1}$ VCRBs, and wherein at any level $1<p<P-1$, each $VCRB_{p,k}$ contains 2 VCRBs: $VCRB_{p-1,k}$, $VCRB_{p-1,k+(P-p-1)KL,P}$ at the lower level p−1.

16. A method according to claim 15, wherein the tree structure further has special numbering for each VCRB which simplifies the mapping in step b), enables simple frequency hopping and inference randomization, and enables simple and reliable control channel detection process at the UE.

17. A method of transmitting control channel symbols in an OFDM communication system downlink in each sub-frame, the OFDM communication system including one or more transmit antennae, the method including:
   (a) for each transmit antenna, mapping each of OFDM symbols of a control channel which are to be transmitted over the air to each of corresponding non-punctured logical resource elements of one virtual control resource block $VCRB_{p,k}$;
   (b) for each transmit antenna, mapping logical resource elements in each virtual control resource block $VCRB_{p,k}$ to physical resource elements in each of the first L OFDM symbols so that the physical resource elements are uniformly spaced over the entire transmission bandwidth; and
   (c) for each transmit antenna, transmitting the physical resource elements to user equipment,
   wherein the virtual control resource blocks used in step (a) are organized in a tree structure to enable efficient sharing of $VCRB_{p,k}$ between transmission of multiple control channels to different UE within the same sub-frame, and
   wherein if a CC is sent to a UE using VCRB k of size index p in sub-frames s, then in the sub-frame s+1, VCRB (k+1)mod $K_{L,p}$ of size index p is used to transmit the same CC type to the same UE if such transmission takes place.

\* \* \* \* \*

UNITED STATES PATENT AND TRADEMARK OFFICE
CERTIFICATE OF CORRECTION

PATENT NO. : 8,432,879 B2
APPLICATION NO. : 12/525959
DATED : April 30, 2013
INVENTOR(S) : Bui It is certified that error appears in the above-identified patent and that said Letters Patent is hereby corrected as shown below:

On the Title Page

Column 2, Line 10: Delete "Missouri," and insert -- Missouri. --

In the Specification

Column 5, Line 24: Delete "VCRBP, k[s+n]" and insert -- VCRBP, k[s+1] --

Column 5, Line 31: Delete "k[s+1]≈k[s]." and insert -- k[s+1]≠k[s]. --

Column 5, Line 50: Delete "2(P-p-1)KL,P-" and insert -- 2(P-p-1)KL,P-1 --

Column 5, Line 58; Delete "$X_{p,k,l}(B_{L,p}-1)$," and insert -- $X_{p,k,l}(B_{L,p}-1)$, --

Column 7, Line 12: Delete "(12N))" and insert -- (12n)) --

Column 7, Line 16: Delete "(12N))" and insert -- (12n)) --

Column 7, Line 23: After "that" insert -- are --

In the Claims

Column 8, Line 49: In Claim 5, delete "(R,N/BL,P)" and insert -- (R.N/BL,P) --

Signed and Sealed this
Sixteenth Day of December, 2014

Michelle K. Lee
*Deputy Director of the United States Patent and Trademark Office*